US011379601B2

(12) United States Patent
Agarwal

(10) Patent No.: US 11,379,601 B2
(45) Date of Patent: Jul. 5, 2022

(54) DETECTION OF SENSITIVE DATABASE INFORMATION

(71) Applicant: PayPal, Inc., San Jose, CA (US)

(72) Inventor: Anchika Agarwal, Singapore (SG)

(73) Assignee: PayPal, Inc., San Jose, CA (US)

( * ) Notice: Subject to any disclaimer, the term of this patent is extended or adjusted under 35 U.S.C. 154(b) by 243 days.

(21) Appl. No.: 16/711,071

(22) Filed: Dec. 11, 2019

(65) Prior Publication Data

US 2021/0182413 A1 Jun. 17, 2021

(51) Int. Cl.
*G06F 21/62* (2013.01)
*H04L 9/40* (2022.01)

(52) U.S. Cl.
CPC ........ *G06F 21/6218* (2013.01); *H04L 63/105* (2013.01); *H04L 63/1433* (2013.01); *H04L 63/20* (2013.01)

(58) Field of Classification Search
CPC ............... G06F 21/6218; H04L 63/105; H04L 63/1433; H04L 63/20
USPC ........................................................... 726/1
See application file for complete search history.

(56) References Cited

U.S. PATENT DOCUMENTS

| 6,999,950 | B1 | 2/2006 | Linneberg et al. |
| 7,161,465 | B2 | 1/2007 | Wood et al. |
| 8,256,006 | B2 | 8/2012 | Grzymala-Busse et al. |
| 8,261,342 | B2 | 9/2012 | Newman |
| 9,324,022 | B2 | 4/2016 | Williams, Jr. et al. |
| 9,419,857 | B1 | 8/2016 | Ryan et al. |
| 9,749,349 | B1* | 8/2017 | Czarny ............... H04L 63/1433 |
| 9,779,253 | B2 | 10/2017 | Mahaffey et al. |
| 10,715,542 | B1* | 7/2020 | Wei ........................ G06F 16/958 |
| 10,839,052 | B2* | 11/2020 | Williams .............. G06F 21/577 |

(Continued)

FOREIGN PATENT DOCUMENTS

WO 2000072171 11/2000

OTHER PUBLICATIONS

Sun et al., "Access Control Method Based on Multi-level Security Tag for Distributed Database System", 2011 International Conference on Electronic & Mechanical Engineering and Information Technology, pp. 2509-2512 (Year: 2011).*

(Continued)

*Primary Examiner* — Khalil Naghdali
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a method that includes maintaining first and second databases within respective first and second security zones, having respective first and second sets of security rules. The first set of security rules defines restrictions for storing data objects within the first security zone, and the second set of security rules defines restrictions for storing data objects within the second security zone. The method further includes performing a first scan of the first database to determine whether data objects stored in the first database comply with the first set of security rules, and performing a second scan of the second database to determine whether data objects stored in the second database comply with the second set of security rules. The method also includes conveying results of the first and second scans to a repository zone. Results are conveyed without conveying the data objects.

20 Claims, 9 Drawing Sheets

(56) References Cited

U.S. PATENT DOCUMENTS

| | | | |
|---|---|---|---|
| 2004/0015728 A1* | 1/2004 | Cole | H04L 63/145 |
| | | | 726/23 |
| 2004/0068661 A1* | 4/2004 | Dettinger | G06F 21/6227 |
| | | | 726/1 |
| 2015/0242531 A1* | 8/2015 | Rodniansky | G06F 21/6218 |
| | | | 707/782 |
| 2015/0254555 A1 | 9/2015 | Williams, Jr. et al. | |
| 2018/0232528 A1 | 8/2018 | Williamson et al. | |
| 2020/0328885 A1* | 10/2020 | Tola | H04L 9/3271 |
| 2021/0119764 A1* | 4/2021 | Meghji | H04L 9/0643 |

OTHER PUBLICATIONS

Kvet et al., 2018 IEEE Proceeding of the 22nd Conference of Fruct Association, "Temporal Database Architecture Enhancements", pp. 121-130 (Year: 2018).*

International Appl. No. PCT/US2020/064201, International Search Report and Written Opinion dated Feb. 19, 2021, 8 pages.

Neculoiu et al.,"Learning Text Similarity with Siamese Recurrent Networks", Proceedings of the 1st Workshop on Representation Learning for NLP, Aug. 11, 2016, Retrieved on Jan. 28, 2021, Retrieved from URL: www.aclweb.org/anthology/W16-1617.pdf, entire document, 10 pages.

Takase et al.,"Character n-gram Embeddings to Improve RNN Language Models", arXiv, 1906.05506v1, Jun. 13, 2019, Retrieved on Jan. 28, 2021, Retrieved from URL: https://arxiv.org/pdf/1906.05506.pdf, entire document, 9 pages.

* cited by examiner

Security rules 130

| rule 330a | email address | email addresses permitted |
|---|---|---|
| rule 330b | login credentials | credentials encrypted |
| rule 330c | home address | home addresses encrypted |
| rule 330d | telephone number | telephone numbers encrypted |
| rule 330e | credit card data | credit card data restricted |

Scan models 235

| model 335a | media | don't scan |
|---|---|---|
| model 335b | encrypted | scan for credit card data |
| model 335c | text | default scan |
| model 335d | email contacts | scan for home address and telephone number |

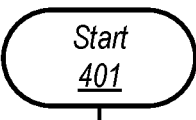
Start
401

Maintaining a first database within a first security zone having a first set of security rules, wherein the first set of security rules defines restrictions for storing data objects within the first security zone.
410

Maintaining a second database within a second security zone having a second set of security rules, wherein the second set of security rules defines restrictions for storing data objects within the second security zone.
420

Performing, by a computer system within the first security zone, a first scan of the first database to determine whether data objects stored in the first database comply with the first set of security rules.
430

Performing, by the computer system within the second security zone, a second scan of the second database to determine whether data objects stored in the second database comply with the second set of security rules.
440

Conveying, by the computer system, results of the first and second scans to a repository zone for review by an administrator, wherein the results are conveyed without conveying the data objects stored in the first and second databases to the repository zone.
450

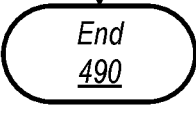
End
490

FIG. 4

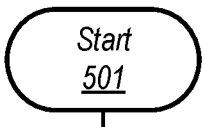
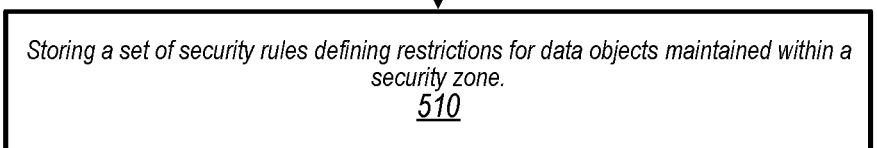
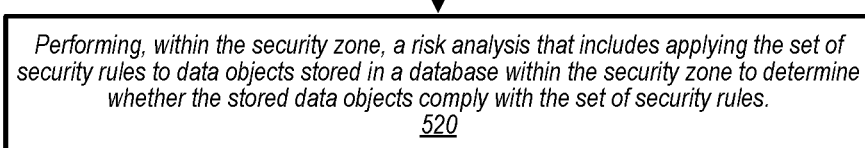
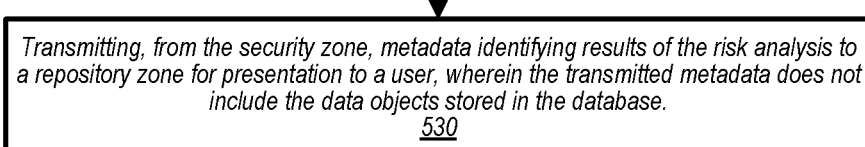
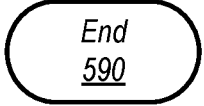
FIG. 5

DETECTION OF SENSITIVE DATABASE INFORMATION

BACKGROUND

Technical Field

This disclosure relates generally to computer system operation, and more particularly to securing sensitive data objects within a computer system.

Description of the Related Art

A business, government agency, school system, or any other form of large, multi-user entity may rely on an enterprise computing system to provide a computing infrastructure for a plurality of users. An enterprise computing system typically includes one or more server computers to provide computing power and one or more databases to provide network accessible information storage for these users. As an enterprise computing system grows, so too does the amount of accessible information being created by services and users, and stored in the one or more databases. Various databases within an enterprise computing system may have different security rules based on a type of information that is permitted to be stored in each database. For a particular database, these security rules may include identifying types of data that are permitted to be stored in the particular database along with specifying a particular storage format for each type, e.g., usernames and passwords may be permitted if the information is encrypted using a particular encryption algorithm, while credit card or other financial information may be forbidden from being stored on the particular database. One reason for implementing security rules is to limit accessibility to individual pieces of information in the event of a database breach.

A database breach occurs when an unauthorized user gains access to a restricted database, such as a hacker gaining access to a company's user account database, potentially allowing the hacker to access individual user accounts. Data protection laws are being enacted globally to motivate entities that manage databases with sensitive information to improve their security standards, thereby reducing exposure of sensitive information stored on their databases. Failure of an entity to follow these data protection laws may result in fines and/or lawsuits.

BRIEF DESCRIPTION OF THE DRAWINGS

FIG. 3 includes two tables depicting, respectively, a set of security rules and a set of scan models.

FIG. 4 is a flow diagram illustrating an example method for performing a risk analysis scan, according to some embodiments.

FIG. 5 shows a flow diagram of an embodiment of a method for performing a risk analysis scan within a particular security zone.

DETAILED DESCRIPTION

Figure 1:
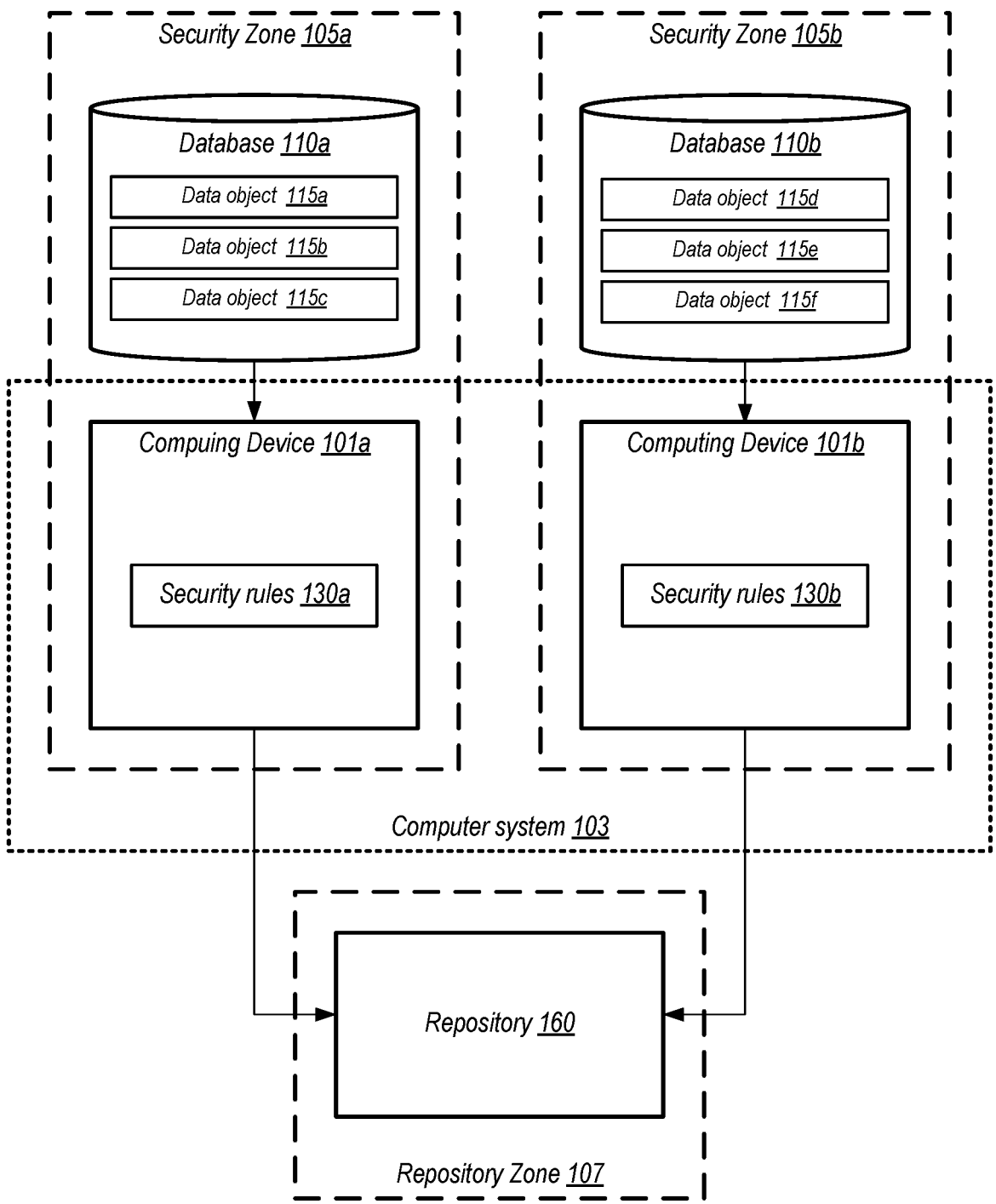
FIG. 1 illustrates a block diagram of an embodiment of an enterprise computing system.

Large-scale database breaches have made global news in recent years. In some breaches, sensitive data was not protected using an appropriate level of security, allowing hackers to gain access to and exploit information such as user account credentials or credit card information. The problem also grows as the amount of data being handled by an enterprise increases. Some enterprise computing systems may include multiple databases that can, combined, include many terabytes of data being stored by multiple users (thousands or even millions of users in some cases). Accordingly, system administrators that are responsible for reviewing and maintaining proper storage of information in accordance with established security rules have the challenge of adequately scanning information stored in each database to determine if each data item is being stored in accordance to the security rules for a respective database. The present inventors have recognized the desirability of a technique that can increase a system administrator's capability to scan a large amount of information that is stored across multiple databases in a computing system such as an enterprise computing system.

Techniques are disclosed herein for scanning a plurality of data objects that are stored in a first database within a first security zone having a first set of security rules, and a second database within a second security zone having a second set of security rules. A "zone" refers to a collection of one or more data repositories (e.g., databases or other memory) that have some common characteristic (e.g., they are controlled by a particular network device, located in a common location, operate according to a set of policy rules, etc.). A "security zone" is a zone that is managed according to a set of security rules. A system administrator or other authorized entity establishes a set of rules for a particular zone based, for example, on a type of information that is or will be stored in the data repositories that are included in the particular security zone. Multiple different security zones may exist within a computer network, with the potential that each zone might have a different set of security rules. A change to the set of security rules for a given security zone changes the security rules for the one or more databases in the given security zone. In one example, a computer system performs a first scan of the first database to determine whether data objects stored in the first database comply with the first set of security rules. The computer system then performs a second scan of the second database to determine whether data objects stored in the second database comply with the second set of security rules. After completing the scans, the computer system conveys results of the first and second scans to a repository zone (that is, a zone for storing the results, which can be any suitable data repository) for review by a system administrator. Since the data objects being scanned may include sensitive information, the results are conveyed without conveying the actual data objects to the repository zone.

A block diagram of an embodiment of an enterprise computing system is illustrated in FIG. 1. As shown, enterprise computing system 100 includes security zones 105a and 105b, as well as repository zone 107. Each of security zones 105a and 105b include respective one of databases 110a and 110b, each database storing a respective subset of data objects 115a-115f. Security zones 105a and 105b also include a respective one of computing devices 101a and 101b, each computing device including a respective one of security rules 130a and 130b. Repository zone 107 includes repository 160.

Enterprise computing system 100 may be any suitable computing system utilized by an entity (business, government, education system, and the like) to provide computing services to multiple users. In various embodiments, enterprise computing system may be implemented on a few computing devices that are all located in one room, may be implemented on hundreds or thousands of computing devices located across the world, or may be implemented on a scale between these examples. Databases 110a and 110b are maintained in one or more respective storage devices, such as magnetic hard drives, solid-state drives, removable storage devices (e.g., CD-ROM, DVD-ROM, etc.), and the like.

As illustrated, databases 110a and 110f are maintained in security zones 105a and 105b, respectively. Each security zone 105a and 105b has a respective set of security rules 130a and 130b. Security rules 130a and 130b define restrictions for storing data objects within security zones 105a and 105b, respectively. Each of security rules 130a and 130b include indications of one or more types of information that may be stored in the respective database 110a-110b, along with any particular restrictions for storing a given type of information.

For example, database 110a may be accessible by a small number of users that have a high level of access permissions within enterprise computing system 100. Access to database 110a may, therefore be limited with multiple levels of authentication required to access anyone of data objects 115a-115c that are stored in database 110a. Accordingly, security rules 130a may allow for a wide variety of types of information to be stored in database 110a, such as user account credentials, financial information, classified reports, and the like. Database 110b, however, may be accessible to all employees of an entity that owns enterprise computing system 100, and/or to external owners of accounts with the entity. Security rules 130b, therefore, may be more restrictive than security rules 130a since database 110b is accessible by a greater number of users. Furthermore, database 110b may require fewer authentication steps, thereby making database 110b more vulnerable to hacking by an unauthorized user than database 110a. Security rules 130b may restrict storage of user account credentials to data objects that are encrypted by an approved encryption algorithm, and may forbid storage of financial or confidential information altogether.

Data objects 115a-115f may correspond to any suitable form of electronic data, such as text files, binary files, executable files, and the like. For example, a data object may be a word processor file, a spreadsheet file, a saved email, an executable script, an image file, an audio file, or any other type of data that may be stored in a database. Due to the nature of the various types of data that may be stored in a particular database, security rules 130a and 130b may not be enforceable at a time when a data object is stored. A particular user may, intentionally or not, store a document that includes classified information into database 110b even though the particular user has been made aware of security rules 130b.

To help a system administrator identify potential security rule violations, a scan may be performed to access data objects stored in the various databases and determine a type of data in a given data object and evaluate storage of the given data object based on the respective security rules. As shown, computer system 103 performs, within security zone 105a, a first scan of database 110a to determine whether a randomly selected first group of data objects 115a-115c that are stored in database 110a comply with security rules 130a. Computer system 103 includes computing devices 101a and 101b, each in a respective one of security zones 105a and 105b. To perform the first scan, computing device 101a accesses each of data objects 115a-115c, determines one or more types of data that may be stored in each data object and then compares the determined data types to the security rules for storage of the determined data types. Any potential violations are logged. In a similar manner, computer system 103 also performs, within security zone 105b, a second scan of database 110b to determine whether a randomly selected second group of data objects 115d-115f that are stored in database 110b comply with security rules 130b. To perform the second scan, computer system 103 utilizes computing device 101b that is within security zone 105b.

In some embodiments, not all data objects stored in a database are scanned during a given risk analysis scan. For example, in some embodiments, certain types of data objects may not be scanned, such as media files, program executable files, and/or operating system files. In some embodiments, databases 110a and/or 110b may include a very large amount of data, such as terabytes or petabytes of data. Such large amounts of data may be impractical to scan, depending on an amount of processor bandwidth available for performing the scan, as well access times for retrieving the data objects from databases 110a and 110b. In such embodiments, data objects 115a-115f may be selected at random from databases 110a and 110b. As used herein, "selecting at random" and "randomly selecting" refers to use of an algorithm or other suitable technique to select data objects in an order that is not easily repeatable. It is noted that some randomizing techniques, commonly referred to as "pseudo-random," may not result in a truly random pattern, and may therefore, be repeatable under controlled conditions. Use herein of "randomly selecting" and "selected at random" include both truly random and pseudo-random techniques.

In the illustrated embodiment, a particular security rule included in security rules 130a or security rules 130b includes one or more criteria that are usable to match a given data object to a particular classification. To perform the first and second scans, computer system 103, utilizing the respective computing devices 101a and 101b, uses the one or more criteria to determine a confidence score for a particular one of data object 115a-115f. This confidence score indicates a level of confidence that the particular data object matches the particular classification. The particular security rule specifies a respective level of security to be enforced on a given data object that is matched to the particular classification. Computer system 103 compares the specified level of security for the particular data object to a security level of the respective one of security zones 105a and 105b. In some cases, the particular data object is encrypted, and to determine the confidence score for an encrypted data object, computer system 103 determines the confidence score without performing a decryption operation. For example, computer system 103 may not have access to a decryption key for an encrypted data object. In such a case, computer system 103 may evaluate the encrypted data object by looking for particular patterns in the encrypted data that may be indicative of particular data types such as credit card numbers or email addresses. The confidence score may typically be lower for encrypted data than for unencrypted data.

It is noted that, as shown in FIG. 1, computer system 103 includes a plurality of computing devices 101a-101b, each computing device 101a-101b included in a respective security zone 105a-105b. Computer system 103 utilizes respective computing devices 101a-101b to perform the corresponding first and second scans. Each of computing devices 101a and 101b may be, for example, a desktop or laptop computer, a server computer hosting the respective database, a dedicated hardware device for performing scans, a virtual machine assigned to a respective security zone, or any other suitable device capable of performing the disclosed operations. In some embodiments, however, a same computing device with access to each security zone may be utilized to perform each of the first and second scans. For example, enterprise computing system 100 may be implemented partially or entirely within a cloud-based computing system. It is contemplated that some or all of the elements of enterprise computing system 100 may be implemented on a common physical computing device, such as a single blade server included in a server computer.

After completing the first and second scans, computer system 103 conveys results of the first and second scans to repository zone 107 for review by the system administrator. These conveyed results are stored in repository 160 included in repository zone 107. To maintain security levels for the data objects, computer system 103 conveys the results without conveying the data objects stored in the first and second databases to repository zone 107. Repository 160 may not have a level of access security that is as high as some security zones. Therefore, storing the actual data objects may violate security rules for storage of some types of data. Accordingly, computer system 103 may, in some embodiments, only convey information about a scanned data object without sending any data included in the scanned data object.

Computer system 103 determines, based on a type of data included in a particular data object in a given database, a risk analysis score for the particular data object. This risk analysis score indicates a level of compliance of storage of the particular data object with a corresponding one of security rules 130a or 130b. In some embodiments, computer system 103 determines to convey the risk analysis score to repository zone 107 in response to the risk analysis score satisfying a threshold risk value. For example, a risk analysis score may, in some embodiments, range from 0 to 100, with a score of '0' indicating a lowest level of risk to the security of a given data object and '100' indicating a highest level of risk. (But any suitable spectrum of scores, such as 0 to 1, is feasible.) A threshold may be set at 50 and computer system 103 conveys those risk analysis scores that are higher than 50. The threshold may be set by the system administrator, by a government or industry regulation, by a statistical analysis of the risk analysis scores, or by any other suitable process. In various embodiments, the threshold may be set individually for each security zone, or may be set to a single value for all security zones in enterprise computing system 100.

Use of such a technique as described in regards to FIG. 1 may allow for a scalable security scanning solution that allows for scans to be configured for respective security zones while consolidating results into a central repository. This technique may provide flexibility for system administrators who are responsible for one or more security zones to set rules appropriate to the security needs of each security zone. Furthermore, consolidating results using risk analysis scores may avoid security issues in the central repository since no secure data is sent to the repository. The repository allows for system administrators or other authorized entities to have access to risk analysis from across an enterprise computing system, while reducing a burden on respective system administrators to share local risk results from each security zone.

It is noted that the embodiment of FIG. 1 is merely an example for demonstration of disclosed concepts. In other embodiments, the illustrated enterprise computing system may include a different combination of elements, including additional elements. For example, computing devices 101a and 101b may correspond to a same physical computing device in some embodiments. Other embodiments may include additional security zones with a respective one or more databases and respective sets of security rules.

Figure 2:
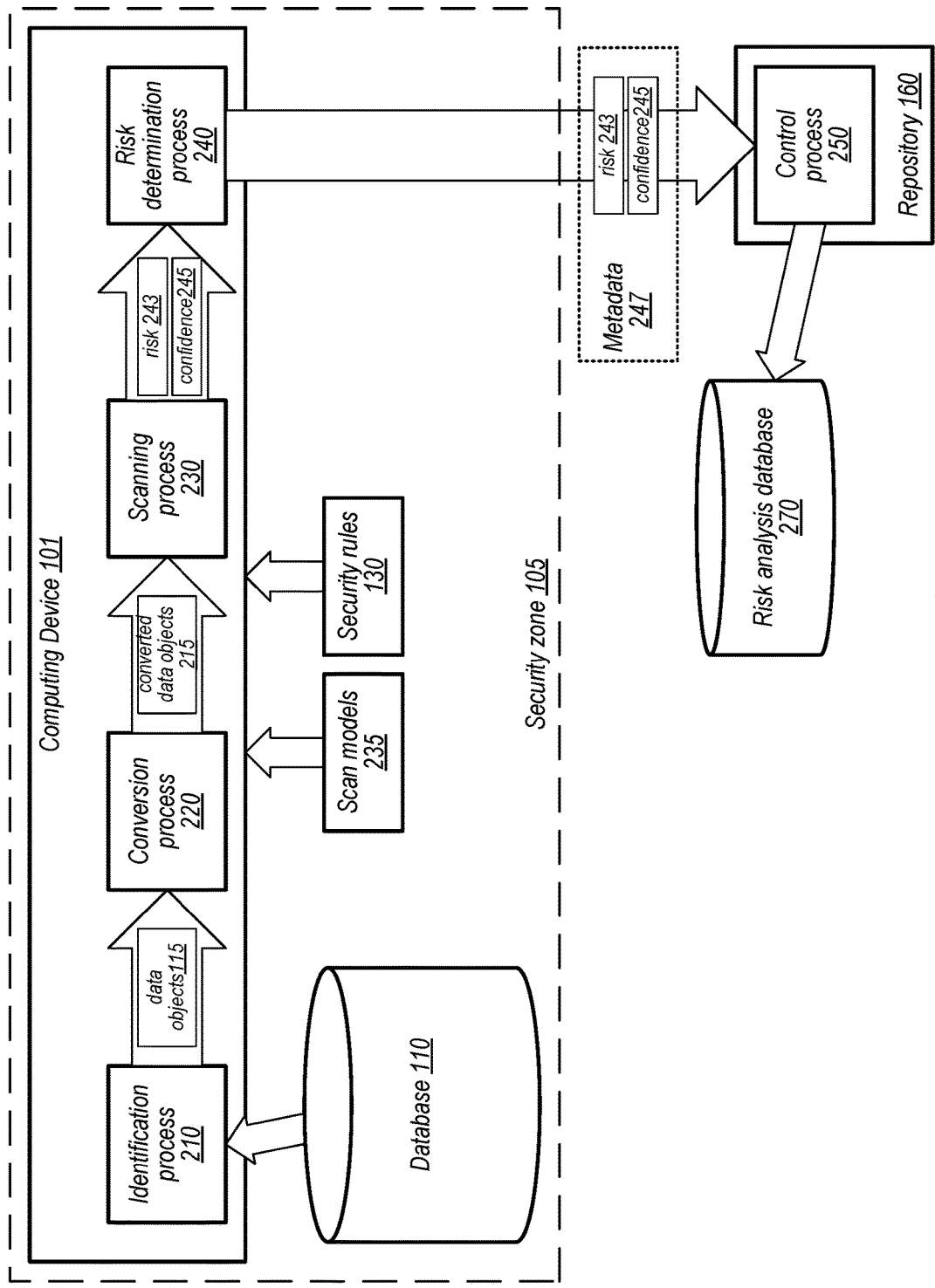
FIG. 2 shows a block diagram of an example of a risk analysis scanning system, according to some embodiments.

The enterprise computing system of FIG. 1 illustrates how a computing system may perform security scans across multiple security zones and consolidate results into a central repository zone. Such security scanning systems may be implemented using a variety of techniques. In FIG. 2, one such security scanning system is described.

Moving to FIG. 2, a block diagram of an embodiment of a risk analysis scanning system is shown. Risk analysis scanning system 200 includes computing device 101, database 110, and repository 160 which may, in various embodiments, correspond to the similarly numbered elements in FIG. 1, and function, therefore, as described in regards to FIG. 1. Repository 160 is coupled to risk analysis database 270. Computing device 101 is configured to perform a security scan of database 110, utilizing a series of processes: identification process 210, conversion process 220, scanning process 230, and risk determination process 240. Results of the security scan are passed to control process 250, performed by repository 160.

Before computer device 101 can start a risk analysis scan, a system administrator or other authorized entity stores a set of security rules 130 that define restrictions for data objects 115 maintained within security zone 105. Security rules 130 may be stored in any suitable memory system, such as a storage drive for computing device 101, a storage device that includes database 110, a universal serial bus (USB) flash drive maintained by the system administrator, and the like. The stored security rules 130 may be set by the system administrator based on company practices, industry standards, government regulations, and so forth. In some cases, security rules 130 may be modified based on updated practices/standards/regulations and/or knowledge gained from known data breech occurrences.

In some embodiments, one or more scan models 235 may be used by computing device 101 to determine how data objects 115 are scanned. While security rules 130 establish what types of data objects 115 are permissible to be stored in database 110 and criteria for how each permitted data object 115 is to be stored, scan models 235 establish criteria for which types of data objects 115 are scanned and a type of scan to perform on each type. For example, security rules 130 may establish that email addresses are permitted to be stored in a password protected file on database 110. A scan model used by computing device 101 to set criteria for scanning email addresses, causes computing device 101 to search data objects 115 to identify files that include email addresses, and then to perform a test to verify that the identified data objects are password protected.

In a different security zone, a different set of security rules establishes that a data object that includes an email address must be encrypted using a particular encryption algorithm before being stored in the respective database. A scan model that sets criteria for scanning email addresses in this different security zone causes a computing device to search data objects in a corresponding different database to identify files that include email addresses, and then to perform a test to verify that the identified data objects are properly encrypted.

As illustrated, after security rules 130 and scan models 235 have been established and stored, computing device 101 receives an indication to begin a risk analysis scan of database 110. In various embodiments, risk analysis scans may be performed by computing device 101 at regular timed intervals, in response to a change to database 110, in response to a start signal from control process 250, in response to a determination that a previous risk analysis scan has completed, and so forth. In some embodiments, computing device 101 initiates a risk analysis scan in response to a determination that one or more processors in computing device 101 have been idle for an amount of time, or that a sufficient amount of processing bandwidth is otherwise available for performing the scan.

In response to the indication, computing device 101 performs, within security zone 105, a risk analysis that includes applying the set of security rules 130 to a randomly selected set of data objects 115 stored in database 110 within security zone 105 to determine whether the selected data objects 115 comply with the set of security rules 130. Computing device 101 begins the risk analysis by performing identification process 210 to identify data objects 115 from within database 110 that will be scanned.

Performing the risk analysis further includes converting the stored data objects 115 from a particular data format to a common data format, different from the particular data format. In some embodiments, data may be stored in database 110 using any number of a variety of data formats. In order to simplify the scanning process, computing device 101 uses conversion process 220 to convert data objects 115 from one or more particular data formats into the common data format, thereby generating converted data objects 215. The common data format may be selected to improve a speed of execution of the risk analysis scan and/or to improve an accuracy of the scan results.

Computing device 101 scans converted data objects 215 using scanning process 230. Scanning process 230 utilizes scan models 235 to determine if sensitive information is being stored in database 110 in compliance with security rules 130. In some embodiments, performing the risk analysis includes initiating a particular number of scanning processes, each scanning process performing a scan on a portion of the selected data objects. The particular number of scanning processes 230 to initiate is based on an available bandwidth of computing device 101. Accordingly, during times of low utilization of computing device 101, a plurality of scanning processes 230 may be initiated, thereby allowing a greater number of data objects 115 to be scanned. In some embodiments, computing device 101 determines a number of data objects 115 that have been added or modified since a most recent scan was performed, and based on the number of modified data objects, adjusting the particular number of scanning processes. In addition to scanning process 230, a plurality of identification processes 210 and/or conversion processes 220 may be initiated when processing bandwidth is available.

As previously disclosed, database 110 may include a very large number of data objects. In some embodiments, performing the risk analysis further includes selecting, at random, a subset of converted data objects 215, and scanning the subset of converted data objects 215 to determine whether the converted data objects 215 comply with the set of security rules 130. The random selection, therefore, may occur at any combination of identification process 210, conversion process 220 or scanning process 230.

Results of a given risk analysis include a confidence score 245 that indicates a probability that a corresponding data object is a particular type of data object. For example, if a particular one of data objects 115 is encrypted, the scanning process may be performed without decrypting the data object. Accordingly, the scanning process may determine a probability that the particular data object includes sensitive information such as email addresses or credit card information. In some embodiments, a plurality of confidence scores 245 may be generated for a given data object, each confidence score corresponding to a respective type of sensitive information. The results of the given risk analysis further include a risk score 243 that indicates an associated level of risk that the corresponding data object is vulnerable to misuse. For example, scanning process 230 may determine that a particular data object has a confidence score 245 corresponding to a 70% likelihood that a credit card number is included. Based on security rules 130 for storing a credit card number, scanning process 230 may further determine that the data object is only password protected whereas the corresponding security rule 130 indicates that credit card numbers are only to be stored in database 110 if a particular encryption algorithm is used on the data object that includes the credit card number.

It is noted that both confidence scores 245 and risk scores 243 may be implemented using any suitable scale of values, with either higher or lower scores indicating corresponding increases in confidence and/or risk. For example, in some embodiments, "low," "medium," or "high" may be used to represent the scores. In other embodiments, scales from 0-1, 0-10 or 0-100 may be utilized.

Computing device 101, using risk determination process 240, transmits, from security zone 105, metadata 247 that identifies results of the risk analysis to a repository zone for presentation to a user. Risk determination process 240 conveys metadata 247 to control process 250 that is performed by a computing device in repository 160. In various embodiments, metadata 247 may be stored within a storage medium included in repository 160 or in a separate database such as risk analysis database 270. Risk analysis database 270 may be accessible by one or more system administrators, such as any system administrator that manages a security zone that scans and sends risk analysis data to the database. The collected metadata from various security zones is capable of being analyzed to identify various levels of risk and to track information storage within an enterprise computing system to determine if storage rules are being properly followed.

To protect sensitive information, the transmitted metadata 247 does not include the corresponding data objects 115 that are stored in the database. Metadata 247, however, includes confidence score 245 and risk score 243. Metadata 247 may also include, for example, identification data for the data objects that include information that may be at risk. Such data can be used by a system administrator to locate the data object in database 110 and modify the data object such that sensitive information is properly stored in accordance with security rules 130. For example, the system administrator may encrypt the data object, or may contact an owner of the data object to inform them of the at-risk information and request the owner to correctly store the data object.

In some embodiments, computing device 101 sends metadata 247 in response to a determination that the corresponding risk score 243 satisfies a particular threshold score. The risk score 243 may be further weighted using the associated confidence score 245. Such threshold scores may be established by the system administrator. In addition, threshold scores may be set to different values for each security zone in an enterprise computing system.

It is noted that the risk analysis scanning system of FIG. 2 is merely an example. In other embodiments, the risk analysis may be performed using a different number of processes. In some embodiments, different processes may be combined, for example, identification and conversion processes. Although a single computing device is shown in FIG. 2, the risk analysis may be performed by a plurality of computing devices. For example, some processes, such as the identification and conversion processes may be performed by one computing device while the scanning process is performed by another computing device. A third computing device may be used to perform the risk determination process.

It is also noted that the processes described in FIG. 2 may be implemented as program instructions included a software program. Such a software program may be stored in a non-transitory, computer-readable medium having program instructions stored thereon that are executable by the computing device to cause the operations described with reference to the processes shown in FIG. 2.

In the descriptions of FIGS. 1 and 2, a risk analysis scan is described as a procedure to determine if information is stored in accordance with associated security rules. Security rules may include a broad spectrum of data types and criteria. In addition, scan models are described in the description of FIG. 2 as being used to determine what types of data objects should be included in a scan. Examples of a set of security rules and a set of scan models are presented below in regards to FIG. 3.

Turning to FIG. 3, two tables depicting respective examples of a set of security rules and a set of scan models are illustrated. As described above, security rules establish what types of data objects are permissible to be stored in a particular database and criteria for how each permitted data object is to be stored. Scan models establish criteria such as the types of data objects that will be scanned as well as a type of scan to perform on each established type. Security rules 130 includes five rules 330a-330e, each rule identifying a type of information that may be found in a data object, such as data objects 115 in FIGS. 1 and 2. Each rule further includes a respective criterion for storing the corresponding type of information. Scan models 235 includes four models 335a-335d, each model identifying a type of data object and respective criteria for scanning the corresponding data object type. Security rules 130 and scan models 235 may be applied to one or more databases within a given security zone, such as security zone 105a or 105b.

A particular security rule specifies a respective level of security to be enforced on a data object matched to the particular classification. In the example of security rules 130, rule 330a is directed to email address information. Rule 330a permits storage of email address information without further restrictions. Rule 330b is directed to login credentials (e.g., a username and password combination), and permits storage of login credentials if they are encrypted. Rules 330c and 330d are directed to home address and telephone numbers, respectively, and similarly permit their storage when the information is encrypted. Rule 330e establishes that credit card data is restricted from storage in a database governed by security rules 130. Although the storage security criteria depicted by rules 330a-330e are simply "permitted," "encrypted," and "restricted," it is contemplated that, in other embodiments, additional criteria and/or more specific criteria may be included in a given one of security rules 130. For example, encryption criteria may further include a type of encryption algorithm, such as Advanced Encryption Standard (AES) or Rivest-Shamir-Adleman (RSA). Rule 330a, for example, may include further criteria such as email addresses are permitted without encryption unless the email address is further used as part of a set of login credentials, or is used for password recovery.

A particular model of scan models 235 specifies a type of data object and one or more criteria for scanning that type of data object. As shown, model 335a indicates that media files are not scanned (e.g., video and audio files may be beyond a scope of a particular risk analysis). Model 335b establishes that encrypted files are scanned for credit card data. Since, per security rules 130, other information is allowed to be stored if encrypted, the other types may be skipped within encrypted files. Model 335c calls for a default scan for text files. A default scan may, for example, include scanning for all types of information. Model 335d establishes that home addresses and telephone numbers be scanned for within an email contacts file. For example, a contacts file may include fields for limited types of information, and therefore, may exclude information such as credit card data.

During a risk analysis scan, a computing device compares the specified level of security for the particular data object to a security level of the first security zone. Referring to FIG. 1, for example, computing device 101a, based on scan models 235, scans an encrypted file stored in database 110a for credit card data. If indications of credit card data are detected in the encrypted file, then a risk score is determined based on security rules 130. For example, if the encryption algorithm used on the file is considered strong, the risk of discover and/or misuse of the credit card data may be scored low. A confidence score reflects a level of confidence that the detected data is actually credit card data. If the scan of the encrypted file does not include decrypting the file, then the credit card data may be detected based on hints that the encrypted file includes credit card data, such as a particular data pattern that is indicative of a 16-digit number.

In some embodiments, a new security rule is added to a security zone without interrupting performance of a particular scan currently in progress. Each security rule 330a-330e may be treated by a computing device as an independent object, allowing additions to be made without interrupting risk analysis scans that are in progress. Scan models 335a-335d may be managed in a similar manner. In response to determining that the particular scan has completed, the computing system performs, within the security zone, a new scan of the respective database using the new security rule. In such embodiments, the computing device detects that a new scan model or new security rule has been added and may initiate a new scan using the added rule or model. By allowing such real-time updates to the security rules and scan models, a risk analysis scan may be executed frequently, or continuously as a background process in an enterprise computing system, while still allowing system administrators to make changes to the rules and models that govern the scans.

It is noted that the security rules and scan models depicted in FIG. 3 are merely examples. The depicted rules and models have been simplified for clarity. In other embodiments, the rules and models may include more detailed criteria for establishing the operation of a risk analysis. In addition, the rules and models are shown as text values. In some embodiments, various options may be assigned identifiers (e.g., alpha-numeric or binary encoded) to be used in place of text values.

Risk analysis systems as described above, may be operable to perform a variety of methods. FIGS. 4-7, described below, provide examples of such methods.

Proceeding to FIG. 4, a flow diagram illustrating an example method 400 for performing a security risk analysis is depicted, according to some embodiments. In various embodiments, method 400 may be performed by computer system 103 of FIG. 1 to perform a risk analysis of databases 110a and 110b. For example, computer system 103 may include (or have access to) a non-transitory, computer-readable medium having program instructions stored thereon that are executable by computer system 103 to cause the operations described with reference to FIG. 4. Referring collectively to FIGS. 1 and 4, method 400 begins in block 401.

At block 410, in the illustrated embodiment, method 400 includes maintaining a first database within a first security zone having a first set of security rules, wherein the first set of security rules defines restrictions for storing data objects within the first security zone. Security zone 105a includes database 110a in which data objects 115a-115c are stored. Storage of data objects 115a-115c is governed by security rules 130a. Security rules 130a includes indicators for one or more types of information and corresponding criteria that govern how that type of data is stored in database 110a.

Method 400, at block 420, includes maintaining a second database within a second security zone having a second set of security rules, wherein the second set of security rules defines restrictions for storing data objects within the second security zone. Database 110b is included within security zone 105b and is governed by security rules 130b. Security rules 130b, in a similar manner as security rules 130a, includes one or more rules that establish how various types of information included in data objects 115d-115f are permitted to be stored in database 110b. In some embodiments, security rules 130a and 130b may be different.

Method 400 further includes, at block 430, performing, by a computer system within the first security zone, a first scan of the first database to determine whether a randomly selected first group of data objects stored in the first database comply with the first set of security rules. Computer system 103, as illustrated in FIG. 1, includes computing devices 101a and 101b. Computer system 103 uses computing device 101a to perform a risk analysis scan of database 110a. This risk analysis scan detects various types of information included in data objects 115a-115c and determines if the detected information is stored in accordance with security rules 130a.

At block 440, method 400 further includes performing, by the computer system within the second security zone, a second scan of the second database to determine whether a randomly selected second group of data objects stored in the second database comply with the second set of security rules. In a similar manner as block 430, computer system 103 uses computing device 101b to perform a risk analysis scan of database 110b, determining if detected information in data objects 115d-115f is stored in accordance with security rules 130b. It is noted that the risk analysis scans of blocks 430 and 440 may be performed by a plurality of processes as shown in FIG. 2 and described above. In some cases, dependent upon respective available processing bandwidths of computing devices 101a and 101b, multiple processes may be initiated to improve a speed and/or accuracy of the respective scan.

Furthermore, method 400 includes, at block 450, conveying, by the computer system, results of the first and second scans to a repository zone for review by an administrator, wherein the results are conveyed without conveying the data objects stored in the first and second databases to the repository zone. Results from each risk analysis scan performed in blocks 430 and 440, may include generation of one or more risk scores for each of data objects 115a-115f. A composite risk score may be compiled for data object having multiple risk scores. This composite risk score may be an average of the multiple risk scores or may be a worst-case (highest or lowest, depending on a respective risk scale). The risk score, along with other metadata that identifies the data object corresponding to the risk score, may be sent to repository 160 that is external to security zones 105a and 105b. Since repository 160 is external to security zones 105a and 105b, the metadata sent to repository 160 does not include any sensitive information included in any of data objects 115a-115f.

In some embodiments, the risk score for each data object 115a-115f is compared to a threshold value, and only metadata corresponding to risk scores that satisfy the threshold are conveyed to repository 160. Setting a threshold for conveying scan results may result in less data being sent to repository 160 which may reduce an amount of storage memory used by repository 160 and/or reduce a burden on system administrators in charge of monitoring the results sent to repository 160. Furthermore, in addition to the risk score, a corresponding confidence score may be determined for each scanned data object 115a-115f. The confidence score indicates a level of confidence that a respective scanned data object includes a type of information that is governed by the respective set of security rules. For example, if a security rule places a limitation on how bank account information is stored, then a confidence score for data object 115b indicates a level of confidence that information scanned in data object 115b includes bank account information. Risk scores may be weighted using the respective confidence scores before being compared to the threshold values. The method ends in block 490. In some embodiments, method 400 is repeated continuously or periodically.

It is noted that the illustrated example of method 400 includes elements 401-490. While these elements are shown in a particular order for ease of understanding, other orders may be used and additional elements may be included. For example, blocks 410 and 430 may be performed concurrently with blocks 420 and 440. In some embodiments, blocks 430 and 440 may be performed iteratively, for example, periodically or continuously. Block 450 may, in some embodiments, be performed at the end of each iteration of block 430 and block 440. In other embodiments, block 450 may be performed after a particular amount of time has elapsed since a previous performance of block 450.

Moving now to FIG. 5, a flowchart of an embodiment of a method for performing a risk analysis scan within a given security zone is illustrated. Method 500 may be performed by a computer system coupled to a database in the given security zone, such as computing devices 101a and 101b in FIG. 1. For example, computing device 101 in FIG. 2 may access a non-transitory, computer-readable medium having program instructions stored thereon that are executable by computing device 101 to cause the operations described in regards to FIG. 5. Referring collectively to FIGS. 2 and 5, method 500 begins in block 501.

At block 510, method 500 includes storing a set of security rules defining restrictions for data objects maintained within a security zone. As shown in FIG. 2, security rules 130 are included in security zone 105. In various embodiments, security rules 130 are stored within a storage memory included in computing device 101, within a storage device that includes database 110 or in a different storage device accessible by computing device 101, such as a USB flash drive or network storage drive. Security rules 130, as previously described, include one or more set of criteria establishing permissions for storing various types of information within database 110. In addition, computing device 101 may access scan models 235, stored in a similar location as security rules 130.

Method 500 further includes, at block 520, performing, within the security zone, a risk analysis that includes applying the set of security rules to a randomly selected set of data objects stored in a database within the security zone to determine whether the selected set of data objects comply with the set of security rules. Computing device 101, as shown, performs a risk analysis scan of database 110 to determine whether information within data objects 115 is being stored in accordance with security rules 130. Computing device 101 may initiate and execute a variety of processes to perform this risk analysis. As shown in FIG. 2, for example, computing device 101 executes identification process 210 to identify data objects 115 that are capable of being scanned, and conversion process 220 to convert some or all of data objects 115 into a common data format used by scanning process 230. Computing device 101 performs scanning process 230, using scan models 235, to scan information included in one or more of converted data objects 215 for compliance with security rules 130. Based on the scanning, scanning process 230 generates metadata 247 for each converted data object 215 that is scanned, including a risk score 243 and a confidence score 245. Scanning process 230 further includes other metadata to identify a particular data object 115 that corresponds to a respective risk score 243 and confidence score 245.

At block 530, method 500 also includes transmitting, from the security zone, metadata identifying results of the risk analysis to a repository zone for presentation to a user, wherein the transmitted metadata does not include the data objects stored in the database. Computing device uses risk determination process 240 to determine if a particular generated metadata 247 is to be conveyed outside of security zone 105 to repository 160. In some embodiments, all generated metadata 247 may be sent to repository 160. In other embodiments, for each generated metadata 247, the corresponding risk score 243 is compared to a threshold value and only sent to repository 160 if the threshold is satisfied. In some such embodiments, risk score 243 is weighted using the corresponding confidence score 245 before determining if the threshold is met. Such use of a threshold may reduce a workload on repository 160 as well as a workload on a system administrator managing repository 160. It is noted that metadata 247 does not include any sensitive data that may be included in the corresponding data object 115. Method 500 ends in block 590.

In some embodiments, method 500 is repeated. For example, computing device 101 may continuously repeat method 500, or may repeat performance of method 500 based on a repetitive schedule, such as once a day, once a week, and the like. In other embodiments, performance of method 500 may be dependent on an available bandwidth of computing device 101. Computing device may, in some embodiments, initiate multiple processes that execute concurrently to perform the risk analysis. Such concurrent processing, with a number of active processes based on available bandwidth of computing device 101, may reduce an amount of time for completing a scan. Concurrent processing may also increase an accuracy of a risk analysis scan, for example, by increasing a number of data objects that are scanned.

It is noted that method 500 is one example. While the elements are shown in a particular order, other orders may be used and additional elements may be included. For example, the computing system may initiate multiple processes such that blocks 520 and 530 may overlap during repeated performances of the method.

Figure 6:
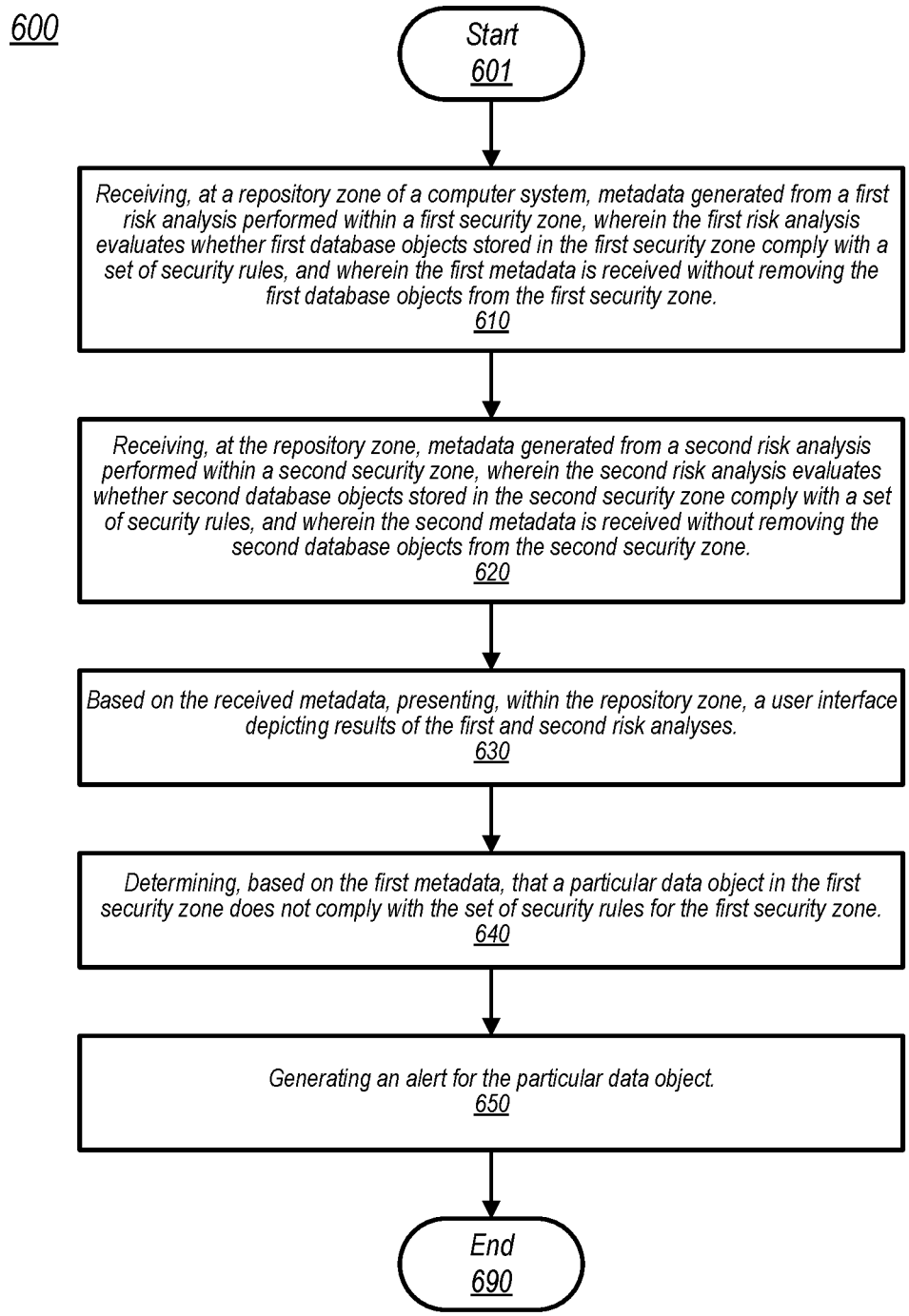
FIG. 6 depicts a flow diagram of an embodiment of a method for receiving, by a repository zone, results of a risk analysis scan.

Turning now to FIG. 6, a flow diagram of an embodiment of a method for operating a risk analysis repository is shown. In various embodiments, method 600 may be performed by repository 160 as shown in FIGS. 1 and 2 to receive risk analysis metadata generated from scans of one or more databases 110, and present results on a user interface. A computing device included in repository 160 may access a non-transitory, computer-readable medium having program instructions stored thereon that are executable by the computing device to cause the operations described in regards to FIG. 6. Referring collectively to FIGS. 1 and 6, method 600 begins in block 601.

At block 610, method 600 includes receiving, at a repository zone of a computer system, first metadata generated from a first risk analysis performed within a first security zone. The first risk analysis evaluates whether a first set of randomly selected data objects stored in the first security zone comply with a set of security rules, and the first metadata is received without removing the first set of database objects from the first security zone. Referring to FIG. 1, repository 160 receives the first metadata from after computing device 101a completing a risk analysis scan of at least one of data objects 115a-115c in database 110a, located in security zone 105a. The risk analysis compares actual storage methods used for storing data objects 115a-115c to security rules 130a that govern the storage of data objects 115a-155c.

Method 600 also includes, at block 620, receiving, at the repository zone, second metadata generated from a second risk analysis performed within a second security zone. The second risk analysis evaluates whether a second set of randomly selected database objects stored in the second security zone comply with a set of security rules, and the second metadata is received without removing the second set of database objects from the second security zone. In a similar manner as described for block 610, computing device 101b sends metadata generated in response to a risk analysis scan of data objects 115d-115f that are stored in database 110b that is located in security zone 105b. Computing device 101b uses security rules 130b to scan database 110b. In various embodiments, security rules 130a and 130b may be the same, may have some rules in common, or may be entirely different.

The metadata generated by computing devices 101a and 101b may be sent after a particular iteration of a respective risk analysis scan has completed. In other embodiments, metadata may be sent after at least one data object has been scanned, but while other data objects continue to be scanned. As is described above, sensitive data that is stored in the data objects is not included in the metadata sent to repository 160. Repository 160, therefore, may not include any sensitive data in some embodiments.

At block 630, method 600 further includes, based on the received first and second metadata, presenting, within the repository zone, a user interface depicting results of the first and second risk analyses. Repository zone 107 may include any suitable number of computing devices, as well as any suitable amount of storage memory. Repository 160 stores the metadata received from computing devices 101a and 101b in the storage memory. In addition, repository 160 presents results in a user interface displayed on one or more display devices (e.g., monitors) coupled to repository 160. In various embodiments, the presented user interface displays any suitable level of detail concerning the results. The user interface may display, for example, a notification that a risk analysis scan has completed for a particular security zone. In some embodiments, the user interface may display one or more metrics about the scan results, such as a number of data objects scanned, and/or a number of scanned data objects with resulting risk scores that satisfied the respective threshold.

A system administrator or other entity with proper authorization may access risk analysis results in repository 160 and generate one or more reports as desired. For example, a first entity may generate a report that provides results specific to a particular government regulation. A second entity may generate a report limited to data objects owned by employees belonging to a particular company division, or assigned to a particular project. Since the repository does not include sensitive data stored in the scanned data objects, a larger number of entities may be authorized to access repository 160, than would be if access to the repository were limited to only entities authorized to view all sensitive data. By providing a more open access, various system administrators and employee supervisors may be capable of viewing results and enforcing corrections if a violation to any security rule is detected.

At block 640, method 600 includes determining, based on the first metadata, that a particular data object in the first security zone does not comply with the set of security rules for the first security zone. In some embodiments, repository 160 includes additional capability for detecting that a particular one of the metadata received from computing device 101a violates security rules 130a and/or presents a level of risk that satisfies a secondary threshold that is more stringent than a local threshold used by computing device 101a. The determining may, as a first example, include identifying, using the first metadata, that a particular data object includes a credit card number. In some embodiments, repository 160 may be configured to detect any reception of metadata associated with a credit card number. In a second example, the determining includes identifying, using the first metadata, that the particular data object is an unencrypted telephone number. In such embodiments, repository 160 may be configured to detect any reception of metadata associated with any sensitive data that is stored without any encryption.

Method 600, at block 650, includes generating an alert for the particular data object. Upon detecting a particular violation of security rules within the received metadata, repository 160 generate an alert. Referring to the first example of the previous paragraph, the generating includes generating the alert in response to determining that the set of security rules for the first security zone restricts storage of credit card numbers. Referring to the second example, the generating includes generating the alert in response to determining that the set of security rules for the first security zone requires telephone numbers to be encrypted. The generated alert may be implemented by any suitable technique. For example, the alert may be an email sent to one or more entities, such as a system administrator in charge of the first security zone, and/or to a supervisor of an owner of the data object associated with the particular data object. The alert may be a pop-up window on a display coupled to repository 160. The alert may further include sending a text message or push notification to a mobile device of a system administrator and/or supervisor. The method ends in block 690.

It is noted, that method 600 is an example for demonstrating the disclosed concepts. Operations described for method 600 may be performed in a different order and/or additional operations may be included. For example, in an additional operation, the repository may send an acknowledgement to a computing device in response to receiving metadata.

Figure 7:
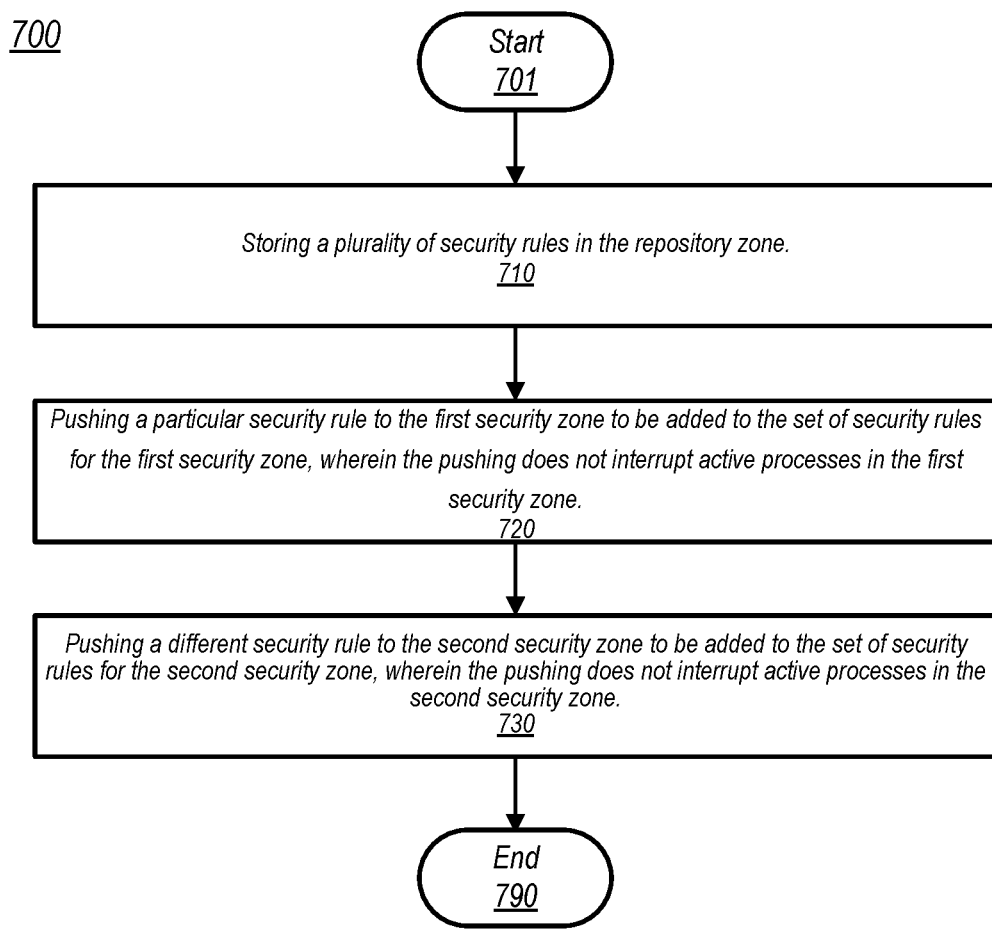
FIG. 7 illustrates a flow diagram of an embodiment of a method for updating, by a repository zone, security rules located within a plurality of security zones.

Proceeding now to FIG. 7, a flow diagram is presented of a method for modifying a set of security rules, according to some embodiments. Method 700, in some embodiments, is performed by a computing device in a repository zone, such as repository 160 in FIG. 1, to add a new security rule to security rules 130a and/or 130b. For example, a computing device included in repository 160 may include (or have access to) a non-transitory, computer-readable medium having program instructions stored thereon that are executable by repository 160 to cause the operations illustrated in FIG. 7. Referring collectively to FIGS. 1 and 7, method 700 begins in block 701.

Method 700, at block 710, includes storing a plurality of security rules in the repository zone. Repository 160, in some embodiments, stores and maintains a set of security rules to be used in one or more risk analysis scans performed by computing devices in security zones 105a and 105b. This set of security rules may be a master list, including every security rule utilized by any computing device that performs a scan in any corresponding security zone. For example, a system administrator responsible for data security compliance across enterprise computing system 100 may generate or obtain various security rules based on a variety sources. Such sources for the security rules include, for example, company policies, industry standards, various government regulations, published best practices, lessons learned from publicized data breeches, and the like.

At block 720, method 700 further includes pushing a particular security rule to the first security zone to be added to the set of security rules for the first security zone, wherein the pushing does not interrupt active processes in the first security zone. The system administrator may select a particular security rule from the master list of security rules to be added to security rules 130a. For example, permission may be added to database 110a to store bank account information. The particular security rule may establish that bank account information is permitted to be stored when encrypted using an AES 256 encryption algorithm. Repository 160 is configured to send the particular security rule to computing device 101a, causing computing device 101a to add the particular security rule to security rules 130a. If computing device 101a is in process of performing a risk analysis scan when the particular security rule is received, the current scan is completed using the prior set of security rules 130a. A next iteration of the risk analysis scan will include use of the added security rule.

Method 700 also includes, at block 730, pushing a different security rule to the second security zone to be added to the set of security rules for the second security zone, wherein the pushing does not interrupt active processes in the second security zone. In a similar manner as described for block 720, a different security rule is determined to be added to security rules 130b in security zone 105b. For example, the different security rule may place additional restrictions on storage of email addresses within database 110b, such as changing from allowing email addresses to be stored with only password protection to requiring encryption of email addresses. Repository 160 sends the different security rule to computing device 101*b* to be added to security rules 130*b*. As described above, if a risk analysis scan is in progress, the current scan is completed using the prior version of security rules 130*b*, and future iterations of the risk analysis scan are performed using the updated security rules 130*b*.

In some embodiments, repository 160 has access to add the new security rules to security rules 130*a* and 130*b* directly, without sending the new rules to either of computing devices 101*a* or 101*b*. In such embodiments, the addition of a new security rule to either of security rules 130*a* or 130*b* does not disrupt a scan that may be in progress within security zones 105*a* or 105*b*. Method 700 ends in block 790.

It is noted that the method illustrated in FIG. 7 is merely an example. In other embodiments, additional operations may be included, and/or illustrated operations may be performed in a different order. For example, operations 720 may be performed in the opposite order or may be performed concurrently. In some cases, only operation 720 or 730 may be performed to update a particular one set of security rules. Furthermore, it is contemplated that a similar method may be used to add scan models to a set of scan models stored in a particular security zone.

Figure 8:
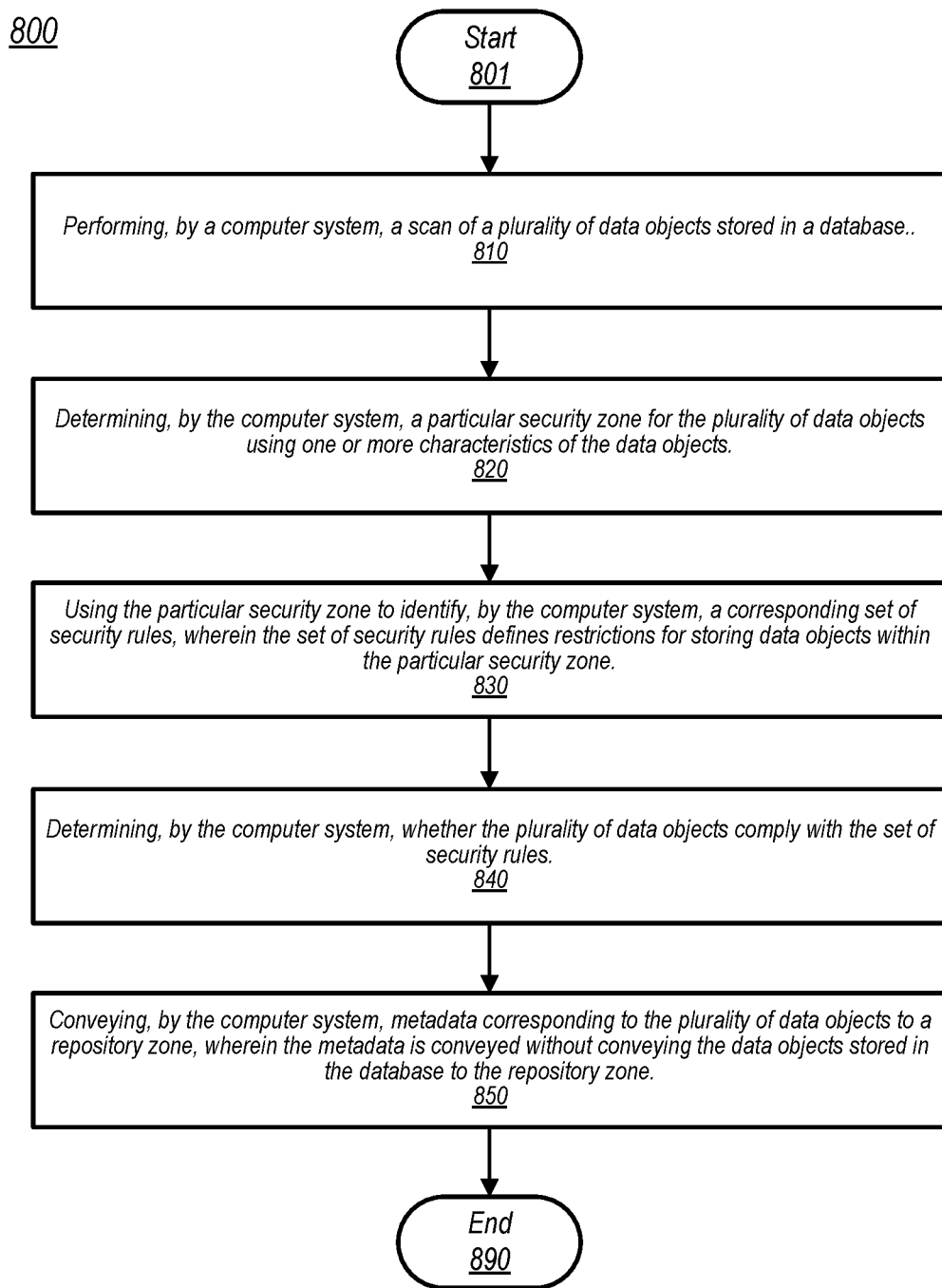
FIG. 8 shows a flow diagram of an embodiment of a method for performing a risk analysis scan on data objects stored in a particular database.

Moving to FIG. 8, a flowchart of another embodiment of a method for performing a risk analysis scan is illustrated. Method 800 may be performed by a computer system coupled to a database in a given security zone, such as computing device 101 in FIG. 2. Computing device 101, for example, may access a non-transitory, computer-readable medium having program instructions stored thereon that are executable by computing device 101 to cause the operations described in regards to FIG. 8. Referring collectively to FIGS. 2 and 8, method 800 begins in block 801.

At block 810, method 800 includes performing, by a computer system, a scan of a plurality of data objects stored in a database. Computing device 101, as shown, performs a scan of data objects 115 stored in database 110. In various embodiments, data objects 115 may include all data objects stored in database 110, or may be a subset of the stored data objects. If a subset is used, then this subset may be randomly selected from the total number of stored data objects.

Method 800 also includes, at block 820, determining, by the computer system, a particular security zone for the plurality of data objects using one or more characteristics of the data objects. Computing device 101, as illustrated, determines security zone 105 based on characteristics of data objects 115. Such characteristics include, for example, a location where each data object is stored, a file type of each data object, content of each data object, metadata stored with each data object, and the like. Using the one or more characteristics, computing device 101 identifies security zone 105 for the plurality of data objects. In some embodiments, computing device 101 may determine a respective security zone for each data object, while in other embodiments, a single security zone is identified for the plurality of data objects 115.

Furthermore, method 800, at block 830, includes, using the particular security zone to identify, by the computer system, a corresponding set of security rules, wherein the set of security rules defines restrictions for storing data objects within the particular security zone. Computing device 101, in some embodiments, accesses a stored set of security rules 130 that correspond to security zone 105. In other embodiments, computing device 101 receives security rules 130 from a different computing device associated with the determined security zone.

At block 840, method 800 includes determining, by the computer system, whether the plurality of data objects comply with the set of security rules. Computing device 101 scans each of data objects 115 to determine a type of data that in included in each of data objects 115. In some embodiments, one or more of data objects 115 may be encrypted. The determination of the data type is made without decrypting the encrypted data object. For each determined type of data included in a data object, a confidence score is determined as well as a risk score. As previously described, the confidence score indicates a level of confidence that the determined data type is accurate and the risk score indicates a level of compliance of the determined type of data to the rules for storing that type of data. For each scanned data object 115, an overall security score may be determined from one or more confidence and risk scores associated with each respective data object 115.

Method 800 further includes, at block 850, conveying, by the computer system, metadata corresponding to the plurality of data objects to a repository zone, wherein the metadata is conveyed without conveying the data objects stored in the database to the repository zone. Computing device 101 sends metadata associated with scanned data objects to repository 160. In some embodiments, the security score for each data object 115 is compared to a threshold value, and only metadata associated with data objects that satisfy the threshold value are conveyed to repository 160. Sensitive data included in a respective data object is not conveyed to repository 160. The method ends in block 890.

Figure 9:
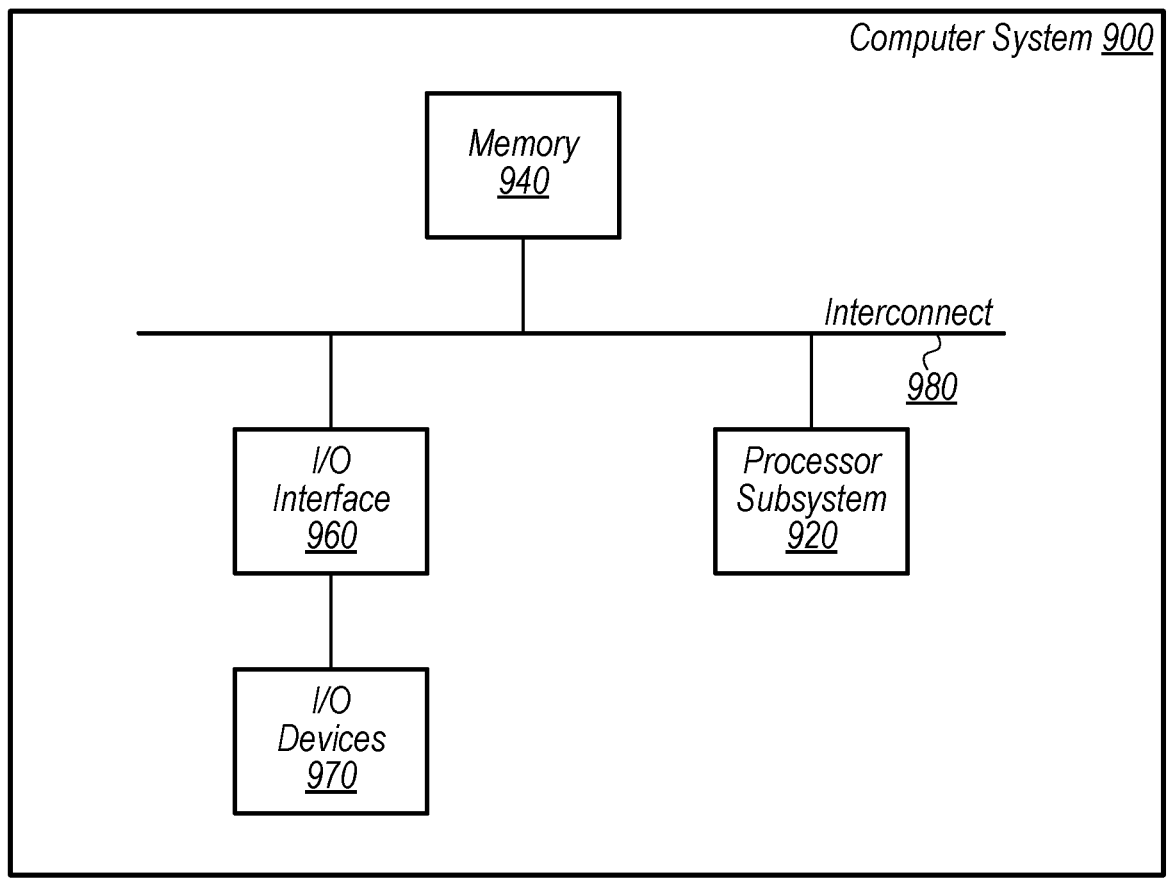
FIG. 9 is a block diagram illustrating an example computer system, according to some embodiments.

Referring now to FIG. 9, a block diagram of an example computer system 900 is depicted, which may implement one or more computing devices, such as computing devices 101*a* and 101*b*, and repository 160 of FIG. 1, according to various embodiments. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 to perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "devices," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "processes" operable to perform designated functions are shown in the figures and described in detail above (e.g., scanning process 230, conversion process 220, etc.). As used herein, the term "process" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A process may also be implemented in programmable hardware devices such as field programmable gate arrays, programmable array logic, programmable logic devices, or the like. A process may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    maintaining a first database within a first security zone having a first set of security rules, wherein the first set of security rules defines restrictions for storing data objects in one or more memory devices within the first security zone;
    maintaining a second database within a second security zone having a second set of security rules, wherein the second set of security rules defines restrictions for storing data objects in one or more memory devices within the second security zone;
    performing, by a computer system within the first security zone, a first scan of the first database to determine whether a randomly selected first group of data objects stored in the first database comply with the first set of security rules;
    performing, by the computer system within the second security zone, a second scan of the second database to determine whether a randomly selected second group of data objects stored in the second database comply with the second set of security rules; and
    conveying, by the computer system, results of the first and second scans to a repository zone for review by an administrator, wherein the results are conveyed without conveying the data objects stored in the first and second databases to the repository zone;
    wherein at least one of the first and second scans includes a particular scan of a particular security zone in which at least one characteristic of the particular scan is adjusted, during the particular scan, based on a determined number of stored data objects that have been modified since a most recent scan of the particular security zone was performed.

2. The method of claim 1, wherein performing the first scan includes initiating a particular number of scanning processes in parallel, each scanning process performing a scan on a portion of the selected first group, wherein the particular number of scanning processes is based on an available bandwidth of the computer system.

3. The method of claim 2, wherein the at least one characteristic of the particular scan includes the particular number of scanning processes initiated by the particular scan.

4. The method of claim 1, further comprising determining, by the computer system based on a type of data included in a particular data object in the first group, a risk analysis score for the particular data object, the risk analysis score indicating a level of compliance of storage of the particular data object with the first set of security rules.

5. The method of claim 4, wherein the conveying includes determining, by the computer system, to convey the risk analysis score to the repository zone in response to the risk analysis score satisfying a threshold risk value.

6. The method of claim 1, wherein a particular security rule of the first set of security rules includes one or more criteria that are usable to match a given data object to a particular classification, and further comprising using, by the computer system, the one or more criteria to determine a confidence score for a particular data object in the first group, the confidence score indicating a level of confidence that the particular data object matches the particular classification.

7. The method of claim 6, wherein the particular security rule specifies a respective level of security to be enforced on a data object matched to the particular classification, and further comprising comparing, by the computer system, the specified level of security for the particular data object to a security level of the first security zone.

8. The method of claim 6, wherein the particular data object in the first group is encrypted, and wherein using the one or more criteria to determine the confidence score for the particular data object includes determine the confidence score without performing a decryption operation.

9. The method of claim 1, further comprising:
    adding a new security rule to the first security zone without interrupting performance of a particular scan currently in progress; and
    in response to determining that the particular scan has completed, performing, within the first security zone, a new scan of the first database using the new security rule.

10. A non-transitory computer-readable medium having instructions stored thereon that are executable by a computer system to perform operations, comprising:
    storing a set of security rules defining restrictions for data objects maintained within a security zone;
    performing, within the security zone, a risk analysis that includes applying the set of security rules to a randomly selected set of data objects stored in one or more memory devices in a database within the security zone to determine whether the selected set of data objects comply with the set of security rules; and
    transmitting, from the security zone, metadata identifying results of the risk analysis to a repository zone for presentation to a user, wherein the transmitted metadata does not include the data objects stored in the database;
    wherein performing the risk analysis includes:
        determining a number of data objects that have been modified since a most recent scan of the database was performed; and
        based on the number of modified data objects, adjusting at least one characteristic of the risk analysis.

11. The non-transitory computer-readable medium of claim 10, wherein results of a given risk analysis include:

a confidence score indicating a probability that a corresponding data object is a particular type of data object; and a risk score indicating an associated level of risk that the corresponding data object is vulnerable to misuse.

12. The non-transitory computer-readable medium of claim 10, wherein performing the risk analysis further includes converting the maintained data objects from a particular data format to a common data format, different from the particular data format.

13. The non-transitory computer-readable medium of claim 12, wherein performing the risk analysis further includes:

selecting the set of data objects from the converted data objects; and scanning the set of the converted data objects to determine whether the converted data objects comply with the set of security rules.

14. The non-transitory computer-readable medium of claim 10, wherein the transmitting includes, in response to results of the risk analysis for a particular data object satisfying a threshold risk level, sending the results for the particular data object to a repository zone.

15. The non-transitory computer-readable medium of claim 10, wherein performing the risk analysis includes initiating a particular number of scanning processes, each scanning process performing a scan on a portion of the selected set of data objects, wherein the particular number is the one characteristic of the risk analysis.

16. A method, comprising:

receiving, at a repository zone of a computer system, first metadata generated from a first risk analysis performed within a first security zone, wherein the first risk analysis evaluates whether a first set of randomly selected database objects stored in the first security zone comply with a first set of security rules, and wherein the first metadata is received without removing the first set of database objects from the first security zone;

receiving, at the repository zone, second metadata generated from a second risk analysis performed within a second security zone, wherein the second risk analysis evaluates whether a second set of randomly selected database objects stored in the second security zone comply with a second set of security rules, and wherein the second metadata is received without removing the second set of database objects from the second security zone; and based on the received first and second metadata, presenting, within the repository zone, a user interface depicting results of the first and second risk analyses;

storing, in the repository zone, a new security rule that is based on at least a portion of the results of the first and second risk analyses; and pushing the new security rule to the first security zone to be added to the first set of security rules, wherein the pushing does not interrupt active processes in the first security zone.

17. The method of claim 16, further comprising:

determining, based on the first metadata, that a particular data object in the first security zone does not comply with the set of security rules for the first security zone; and generating an alert for the particular data object.

18. The method of claim 17, wherein the determining includes identifying, using the first metadata, that the particular data object is a credit card number, and wherein the generating includes generating the alert in response to determining that the set of security rules for the first security zone restricts storage of credit card numbers.

19. The method of claim 17, wherein the determining includes identifying, using the first metadata, that the particular data object is an unencrypted telephone number, and wherein the generating includes generating the alert in response to determining that the set of security rules for the first security zone requires telephone numbers to be encrypted.

20. The method of claim 16, further comprising pushing the new security rule to the second security zone to be added to the second set of security rules for the second security zone, wherein the pushing does not interrupt active processes in the second security zone.

* * * * *